Dec. 25, 1956   S. D. EILENBERGER ET AL   2,775,730
BATTERY CAPACITOR POWER CARTRIDGE
Filed Oct. 2, 1952
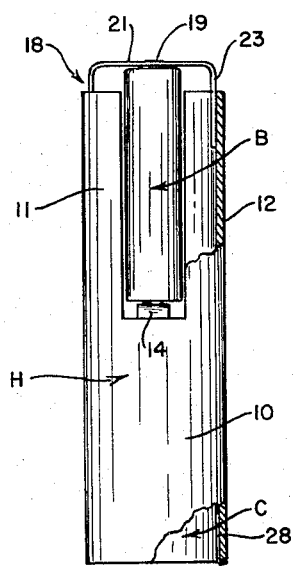
FIG.-1
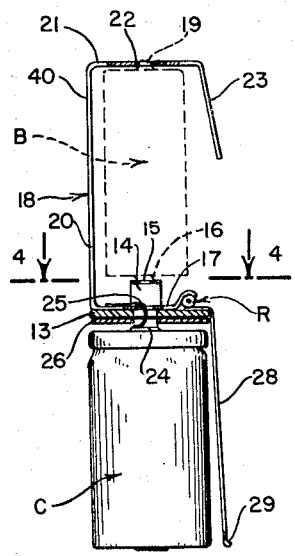
FIG.-2
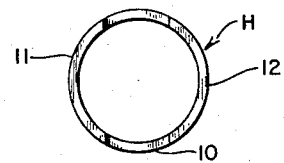
FIG.-3
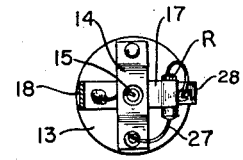
FIG.-4
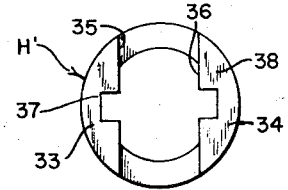
FIG.-8
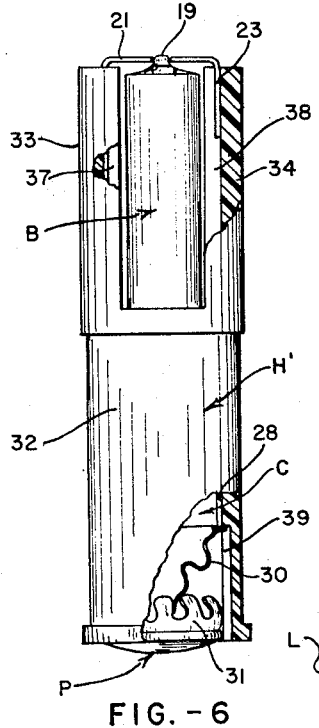
FIG.-6
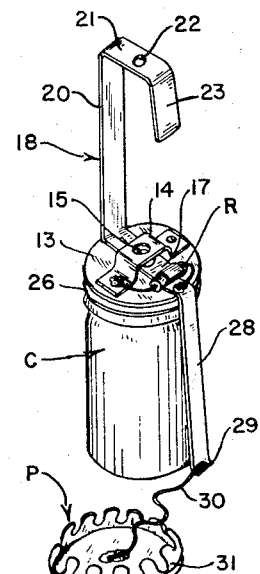
FIG.-7
FIG.-9
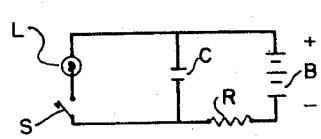
FIG.-5
INVENTORS
Stanley D. Eilenberger
John G. Guenthner
BY
ATTORNEYS United States Patent Office 2,775,730
Patented Dec. 25, 1956

2,775,730

BATTERY CAPACITOR POWER CARTRIDGE

Stanley D. Eilenberger, Kittredge, and John G. Guenthner, Denver, Colo., assignors, by mesne assignments, to Minneapolis-Honeywell Regulator Company, Minneapolis, Minn., a corporation of Delaware Application October 2, 1952, Serial No. 312,772

5 Claims. (Cl. 320—1)

This invention relates to electrical power units and more particularly to such units which embody a battery and capacitor for use where momentary powerful current and energy is desired as, for example, in firing photoflash bulbs.

One of the object of our invention is to produce a simple and compact battery-capacitor cartridge which will permit easy replacement of the battery.

Another object is to produce a power cartridge of the type referred to which will permit assembly of the condenser and resistor, together with battery holding means in circuit as a separate unit and thereby facilitate its mounting in a suitable holding case.

Yet another object is to provide an improved holding case for a battery capacitor power cartridge that will give desired insulation to the battery, condenser and resistor and yet permit easy mounting and replacement of the battery.

A further object is to provide in a battery-capacitor power cartridge improved means for mounting and connecting a battery in the circuit.

Still a further object is to provide in a battery-capacitor power cartridge improved means for mounting the condenser and connecting it into the circuit.

Other objects of the invention will become apparent from the following description taken in connection with the accompanying drawings in which is shown, by way of example, two power cartridges.

In the drawings:

Figure 1 is a side view, with parts broken away, of a power cartridge embodying our invention;

Figure 2 is a side view of the battery holding structure, the condenser, and the resistor in assembled condition prior to inserting into the case as a unit;

Figure 3 is an end view of the case;

Figure 4 is a sectional view taken on the line 4—4 of Figure 2 showing details of the assembly;

Figure 5 is a wiring diagram of the circuit and its connection with the flash lamp;

Figure 6 is a side view with parts broken away showing another form of cartridge embodying our invention;

Figure 7 is a perspective view of the battery holding structure, the condenser, the resistor and contact plug as assembled prior to insertion in the case of Figure 6;

Figure 8 is a top end view of the case of Figure 6; and

Figure 9 is a view of a leg of the case of Figure 6 showing the groove construction thereof.

Referring first to Figures 1 to 4, our improved electrical power cartridge includes as essential elements a small 22½ volt flat type battery B, a condenser C and a resistor R. All of these are mounted in a special casing or housing H whereby it is possible to easily and quickly remove and replace the battery whenever necessary. The casing H may be made of any suitable insulating material such as cardboard, plastic, etc., and it is formed with a cylindrical portion 10 open at both ends and having at one end legs 11 and 12. These legs are semi-cylindrical in cross section, being a continuation of the cylindrical portion, and are so spaced apart that the battery B can be inserted from a lateral direction into a position between the legs, all as shown in Figure 1.

The condenser C, the resistor R and the various necessary electrical connectors for connecting these elements and the battery B in a closed circuit comprise a sub assembly which is a constructed unit made prior to mounting in the casing H. The sub assembly unit is clearly shown in Figure 2 with the battery shown only in dotted lines. The disclosed construction of the sub assembly consists of a mounting member or disc 13, preferably made of insulative material, although it need not be if certain parts to be carried thereby are suitably insulated therefrom. On the top side of this disc 13 is secured, as by rivets, a terminal contact member 14. This member is U-shaped so as to provide a central upstanding section and this section has a small hole 15 therethrough to receive a projecting part of the negative terminal 16 of the battery B. Also mounted on the member 13 alongside the battery terminal contact member is the resistor R, the mounting being accomplished by a clip 17 which is an extension part of a strip conductor 18 for connecting the positive terminal 19 of the battery to the condenser and further provides holding means for the battery. Although the holding clip for the resistor is conducting material, it makes no electrical contact with the terminals of the resistor as it merely engages the insulated casing thereof.

The conductor member 18 which is riveted to the member 13 is a strip of flexible copper or other suitable conducting material and has an L-shaped form with the long leg 20 and its clip portion 17 connected to the member 15 and the short leg 21 extending over the positive terminal end of the battery and being provided with a hole 22 to receive the protuberance of the terminal. In addition to the two major legs of the conductor member, there is also an extension 23 at near right angles to the short leg to give support to the conductor member when it is inserted in the casing H.

The condenser C, which is of cylindrical form with a metallic shell, has its end terminal 24 connected by a wire 25 to the conductor member 18, said wire passing through a hole in the support member. The wire connection is relatively stiff and short, thus providing strong supporting connection. In order that the rivets employed to attach the contact member 15 and the conductor member 18 to the support member 13 shall be fully insulated from the condenser, there is provided a free insulative disc 26 between the end of the condenser and the membr 13.

To complete the closed circuit between the battery and the condenser so the condenser can be charged by the battery, one end of the resistor is connected by a wire 27 to the battery contact member 15 and the other end of the resistor is connected to a conductor strip 28 which will extend downwardly alongside of the metal shell of the condenser C in order to make contact therewith. The free end of this conductor strip has a turned out end 29 to provide a stop means for engaging with the casing end when the sub assembly is inserted therein.

The sub assembly just described will be inserted into the housing H from the open end thereof opposite that of the legs, which for convenience is termed the "between end" of the casing. The cylindrical portion of the casing is of sufficient diameter to snugly receive the condenser, together with the conductor strip 28 so that when the condenser is pushed into the casing it will be held therein and a firm contact made between the strip and condenser shell. The sub assembly will be pushed into the casing to the position where the turned out stop end 29 of the conductor strip 28 engages the end of the cylindrical portion of the casing and when this is done the end of the condenser will extend slightly beyond the casing so its shell can make contact with a contact member of a flash gun. In inserting the sub assembly into the casing, it will be so positioned that the conductor and holding member for the battery B will have its long leg lying inwardly of a casing leg, such as the leg 11 and the extending part 23 lying inwardly of the other leg 12. This will bring the short leg 21 of the conductor member extending across the free ends of the two legs and positioned slightly outwardly thereof. The conductor member 18 will then be properly insulated by the legs of the housing member and the space between the legs will be free so the battery B can be readily inserted, with its negative terminal being received in the hole in the contact member 15 carried by the support member 13 and its positive terminal received into the hole 22 in the short leg of the conductor member 18. During insertion and removal of the battery, the short leg of the conductor member can be flexed relatively to the long leg. The conductor member yieldably holds the battery in position between the contact member 15 and the short leg 21 of the conductor member.

It will be noted that with the electrical power cartridge just described, it can be placed in a barrel of a flash gun in the same manner as a battery and when so placed a circuit will be established as shown in Figure 5. In this circuit will be the closed circuit involving the condenser, the resistor and the battery. There will also be an auxiliary circuit involving the flash lamp L and the switch S for discharging the condenser and causing the lamp to be fired. When the switch is again opened, the battery will recharge the condenser and be ready for another firing of a lamp. It will be further noted that the cartridge is of simple construction and will permit ready insertion and removal of the battery so it can be replaced when its usefulness is gone. By constructing the sub assembly in the manner shown and described, this unit can be made fully outside the casing and then be easily inserted therein. The whole sub assembly is such that all parts can be easily and rigidly fastened to the single central mounting member 13 between the battery and condenser.

In Figures 6, 7, 8 and 9 there is shown a modified form of cartridge differing from the one just described in the construction of the casing and the manner of providing a contact element for the condenser which will be positioned some distance inside of the casing so its shell end will not be available for direct contact with a part of the flash gun to make a discharge circuit to fire the lamp. The sub assembly is shown in Figure 7 and it will be the same as that already described, except for the added contact plug. All the previously described parts are designated by the same reference numerals as used with the sub assembly shown in Figure 2. In addition to the parts of the sub assembly, there will be provided the plug P of conducting material to form a contact member and the conductor wire 30 connecting the plug to the lower end of the conductor strip 28 which extends alongside of the metal shell of the condenser for contact therewith. The plug P has flange type spring fingers 31 extending from its periphery so as to provide yieldable holding means when this plug is inserted in the bottom end of the casing H', preferably moulded of a suitable plastic material.

As shown in Figures 6, 8 and 9 the casing has a cylindrical portion 32 with legs 33 and 34 at one end. The cylindrical portion is of somewhat greater length than the condenser C so that when the sub assembly is mounted therein there will be a space between the lower end of the condenser and the open end of the cylindrical portion. The two legs 33 and 34 are spaced apart so as to provide room into which the flat type battery B can be mounted and yieldably held by the conductor member 18. Instead of the inner surface of the legs having inner and outer curved surfaces formed by being extensions of the wall of the cylindrical portion, as is the casing legs of the Figure 1 form, the legs 33 and 34 are so formed as to have flat inner surfaces 35 and 36 which will be spaced apart slightly greater than the short thickness of the flat battery. Both legs on their inner surfaces are provided with axially extending grooves. The groove in the leg 33 is indicated by the numeral 37 and the groove in the leg 34 is indicated by the numeral 38. These grooves extend throughout the length of the legs and the depths thereof are such that the bottoms will form a continuation of the inner cylindrical surface of the cylindrical portion 32. The lower inner end of the cylindrical portion of the casing H' is provided with a short axially extending groove 39 and this groove will be positioned directly below one groove in the legs, such as the groove 38 in the leg 34. The length of the groove will be such that the stop 29 on the conductor strip 28 will engage the inner end thereof when the condenser and the rest of the sub assembly is mounted in the casing in proper position.

In inserting the sub assembly, the long leg of the conductor 18 will be received in the groove 37 of the leg 33 and the extension 23 on the conductor member 18 will be received in the groove 38 of the leg 34. With these grooves 37 and 38 receiving the conductor and holding member 18, the sub assembly will be prevented from any turning movement in the casing; also the conducting member will be fully insulated and so positioned as to not interfere with insertion and removal of the battery B. When the whole sub assembly is mounted in the casing H', the upper short leg of the conductor member 18 will be slightly above the legs so it can make contact with the proper contact member in the flash gun casing. After the sub assembly has been positioned in the casing H', the lower end of the cylindrical portion will be closed by the plug P which will be merely pressed into the open end where it will be held by the spring fingers 31. The plug P will then provide a contact element for engaging the other contact element in the flash gun so a circuit can be completed with the flash lamp and permit firing thereof upon closing of the switch S in the circuit shown in Figure 9.

From the description of the housing construction H', it will be seen that the structure is also compact and permits the assembling of the condenser, resistor and battery holding means as a unit outside of the casing for ready insertion in the casing. It provides a very rigid, compact construction of the cartridge and assures there will be no turning of the sub assembly unit in its casing.

Being aware of the possibility of modifications in the structures shown and described in detail, all without departing from the fundamental principles of our invention, we desire it to be understood that the scope of the invention is not to be limited except in accordance with the structure and equivalent of the accompanying claims.

What is claimed is:

1. In an electrical power cartridge of the class described, a sub-assembly and a casing of insulating material for detachably receiving and mounting said sub-assembly, said casing comprising a cylindrical portion open at both ends and a passage extending through the entire length of said cylinder, said sub-assembly comprising a supporting member, a battery terminal contact member of conducting material mounted on the supporting member in an insulated manner, combined electrical conductor means and battery holding means secured to the supporting member, said conductor means having yieldable means positioned on one side of the supporting member to engage the remote terminal end of a battery when the other terminal end engages the contact member and thereby yieldably hold the battery on the contact member, a condenser having an outer shell and positioned on the opposite side of the supporting member with its end terminal adjacent the supporting member, means for electrically connecting the end terminal of the condenser to the conductor means and for holding the condenser to the sub-assembly, and a second conductor means connected to the battery terminal contact and extending alongside of the condenser, said casing holding the last named second conductor means in contact therewith when said sub-assembly is inserted in said casing.

2. In an electrical power cartridge of the class described, a sub-assembly and a casing of insulating material for detachably receiving and mounting said subassembly, said casing comprising a cylindrical portion open at both ends, said sub-assembly comprising a disc of insulative material, a resistor mounted on one side of the disc, a battery contact member of conducting material mounted on the same side of the disc and electrically connected to the resistor, an electrical strip conductor of L-shaped form having its long leg secured to the disc and its short leg positioned away from the disc on the same side as the contact member to provide a connection with a battery, said conductor being of yieldable material so that a battery can be held between the contact member and the short leg of the conductor, a condenser having an outer metal shell and positioned on the opposite side of the disc with its end terminal adjacent the disc, means for electrically connecting the end terminal of the condenser to the conductor and for also acting as a means for holding the condenser to the assembly, and means for electrically connecting the resistor to the outer metal shell of the condenser when said sub-assembly is inserted in said casing.

3. In an electrical power cartridge of the class described, a casing of insulative material for detachably receiving and mounting a subassembly comprising, a condenser and battery holding means connected in circuit, said casing comprising a cylindrical portion open at both ends, said subassembly including a supporting member adapted to form a casing partition when the subassembly is received in the casing, a battery terminal contact member of conducting material mounted on the supporting member in an insulated manner, said battery holding means being secured to the supporting member and extending from one side thereof, said holding means being constructed to engage one terminal of the battery and yieldably and detachably hold the other terminal of the battery on the contact member, a condenser having an outer shell and positioned on the opposite side of the supporting member with its end terminal adjacent the supporting member for securing the condenser to the subassembly, and said cylindrical portion of the casing surrounding the condenser when the subassembly is received therein.

4. An electrical power cartridge of the type defined in claim 3 wherein the casing includes a pair of spaced legs forming skirts for a susbtantial part of the holding means but permitting detachment of the battery from the holding means without removing the subassembly from the casing, the partition formed by said supporting member, when the subassembly is received in the casing, substantially dividing said skirts and cylindrical portion.

5. An electrical power cartridge of the type defined in claim 3 wherein the subassembly includes a resistor connected in said circuit and carried by the supporting member, a second conductor connected to the resistor and extending alongside of the condenser for contacting its outer shell, said conductor including abutment means for engaging a portion of the cylindrical portion of the casing to provide a stop means when the subassembly is inserted in the casing.

References Cited in the file of this patent

UNITED STATES PATENTS

| | | |
|---|---|---|
| 2,590,069 | Robinson | Mar. 18, 1952 |
| 2,678,417 | McMath | May 11, 1954 |
| 2,685,668 | Ameele et al. | Aug. 3, 1954 |
| 2,745,051 | Sahmel | May 8, 1956 |